United States Patent
Backes

(10) Patent No.: US 7,751,054 B2
(45) Date of Patent: Jul. 6, 2010

(54) OPTICAL SENSOR DEVICE FOR DETECTING WETTING

(75) Inventor: Ulrich Backes, Radolfzell (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 0 days.

(21) Appl. No.: 12/156,688

(22) Filed: Jun. 3, 2008

(65) Prior Publication Data

US 2008/0297803 A1 Dec. 4, 2008

(30) Foreign Application Priority Data

Jun. 4, 2007 (DE) ............... 10 2007 025 987

(51) Int. Cl.
*G01N 21/55* (2006.01)

(52) U.S. Cl. ............ 356/445; 250/227.24; 250/227.25; 356/239.7; 356/442; 356/435

(58) Field of Classification Search ............. 356/239.7, 356/239.9, 4.5, 442, 445; 250/227.24, 227.25
See application file for complete search history.

(56) References Cited

U.S. PATENT DOCUMENTS

| | | |
|---|---|---|
| 5,898,183 A | 4/1999 | Teder |
| 6,018,165 A | 1/2000 | Kerkmann et al. |
| 6,064,059 A | 5/2000 | Pientka et al. |
| 6,376,824 B1 | 4/2002 | Michenfelder et al. |
| 6,526,190 B2 * | 2/2003 | Holzapfel et al. ........... 356/618 |
| 7,236,249 B1 | 6/2007 | Michenfelder et al. |
| 2006/0043322 A1 | 3/2006 | Ishikawa |
| 2008/0116379 A1 * | 5/2008 | Teder ...................... 250/341.1 |
| 2009/0032689 A1 | 2/2009 | Backes |

FOREIGN PATENT DOCUMENTS

| | | |
|---|---|---|
| CN | 1276911 | 12/2000 |
| CN | 1743833 | 3/2006 |
| DE | 19608648 | 10/1997 |
| DE | 19757821 | 7/1999 |
| DE | 19839273 | 9/1999 |
| DE | 19821335 | 11/1999 |
| DE | 19830120 | 7/2006 |
| EP | 1068112 | 1/2001 |
| EP | 1647458 | 4/2006 |
| FR | 2791435 | 9/2000 |
| WO | 9921206 | 4/1999 |
| WO | 03026937 | 4/2003 |

* cited by examiner

*Primary Examiner*—Gregory J Toatley, Jr.
*Assistant Examiner*—Iyabo S Alli
(74) *Attorney, Agent, or Firm*—Tarolli, Sundheim Covell & Tummino LLP

(57) ABSTRACT

An optical sensor device (10) is able to be coupled to a window (14), in particular to a windscreen of a motor vehicle. The optical sensor device (10) comprises a sensor unit (12), which includes a emitter (26), a receiver (28) and a light conductor unit (30). By the light conductor unit (30), a light beam (34) emitted by the emitter (26) is coupled into the window (14), coupled out of the window (14) and directed onto the receiver (28). The light conductor unit (30) includes Fresnel lens regions and associated reflecting regions.

24 Claims, 3 Drawing Sheets

OPTICAL SENSOR DEVICE FOR DETECTING WETTING

TECHNICAL FIELD

This invention relates to an optical sensor device which can be coupled to a window, in particular to a windscreen of a motor vehicle.

BACKGROUND OF THE INVENTION

Such sensor devices comprising a sensor unit which includes a emitter, a receiver and a light conductor unit by which a light beam emitted by the emitter is coupled into the window, coupled out of the window and directed onto the receiver, are chiefly used as rain sensors in motor vehicles for automatically actuating the wipers. The use of classical lenses for influencing the optical path, such as the lenses of the rain sensor disclosed in European patent EP 1 068 112 B1, which are inclined against the windscreen, requires a relatively large packaging space.

As known for instance from international application WO 03/026937 A1, smaller constructions are possible by using holographic sensors. These sensors are based on the principle of light diffraction by means of defractive elements and therefore have the principal disadvantage of a substantially smaller yield of usable light and a higher susceptibility to extraneous light.

To reduce the distance between emitter and/or receiver and the light conductor unit in an optical sensor device, German patent DE 196 08 648 C1 proposes to form the light inlet and outlet surfaces of the light conductor unit as Fresnel lenses. Nevertheless, the packaging space required for this device is very large due to the complex light conductor unit, which necessitates an arrangement of the circuit board carrying emitter and receiver vertical to the windscreen.

It is an object of the invention to provide an optical sensor device which is able to scan a very large sensor area, yet only requiring a very small packaging space.

BRIEF SUMMARY OF THE INVENTION

According to the invention an optical sensor device comprises a sensor unit which includes an emitter, a receiver and a light conductor unit. The light conductor unit is configured such that a light beam emitted by the emitter is coupled into the window, coupled out of the window and directed onto the receiver. The light conductor unit includes Fresnel lens regions and reflecting regions associated to the Fresnel lens regions. As compared to classical lenses, the light conductor unit with the Fresnel lens regions in accordance with the invention can be designed with a smaller thickness. In addition, the light conductor unit can be arranged parallel to the window so as to save space, because it enables coupling the light beam into and out of the window at an angle. The invention is based on the finding that when a light beam aligned in parallel is suitably coupled into the window at an angle, a relatively large sensor area of the window can be scanned. In addition, the Fresnel lens regions with the associated reflecting regions in accordance with the invention provide for an even more compact design of the light conductor unit.

Particularly favorable for the production and assembly of the optical sensor device of the invention is an embodiment in which the light conductor unit is formed in one piece. In particular, the light conductor unit can be made as a plate, a front side of the plate having a stepped structure (Fresnel structure). The plate is arranged such that the front side of the plate faces the emitter and/or receiver. Apart from the simplified production of the light conductor unit, in which it is only necessary to incorporate (e.g. by embossing) the required steps of the Fresnel structure into a rectangular plate of a suitable optical material, the arrangement of the input region of the light conductor unit relative to the output region is firmly specified and cannot change as a result of mechanical influences either during assembly or in the mounted condition.

DETAILED DESCRIPTION OF THE PREFERRED EMBODIMENTS

Figure 1:
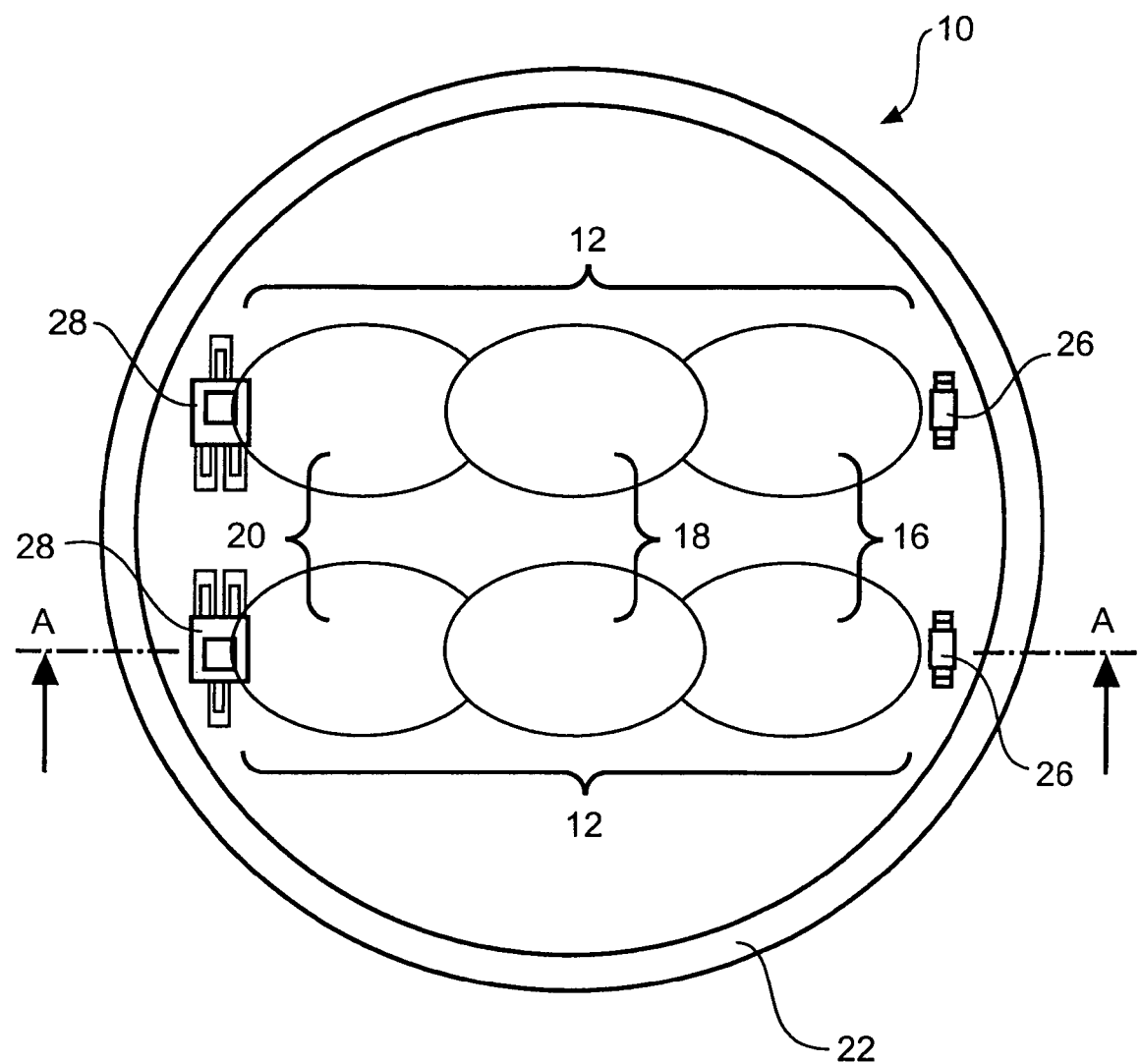
FIG. 1 schematically shows a top view of an optical sensor device in accordance with the invention.

FIG. 1 shows an optical sensor device 10 according to the invention with two identical sensor units 12 for detecting the wetting of a window. In the following, the sensor device 10 will be described for use as a rain sensor which is mounted on the windscreen 14 (see FIG. 2) of a motor vehicle. In the illustration of FIG. 1, a few components of the sensor device 10 are omitted, in order to emphasize the light impingement surfaces 16, 18, 20 described in detail below.

Figure 2:
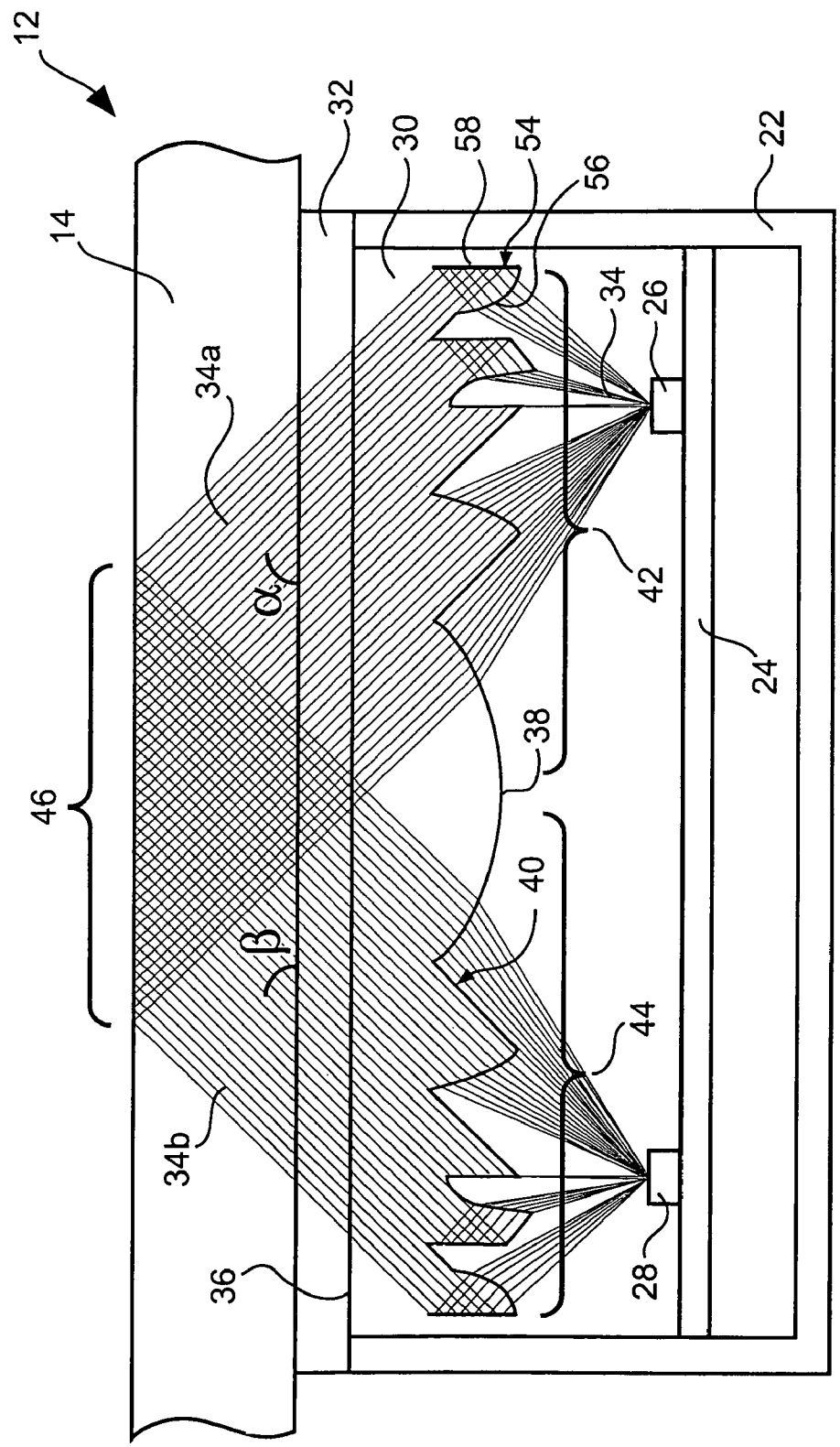
FIG. 2 schematically shows a sectional view along line A-A of FIG. 1.

The basic configuration of the sensor units 12 is illustrated in the sectional illustration of FIG. 2. In a housing 22, which is open on one side, a circuit board 24 with a emitter 26 and a receiver 28 for each sensor unit 12 is accommodated. In the mounted condition of the sensor device 10, i.e. when the sensor device 10 is mounted on a windscreen 14, the windscreen 14 and the circuit board 24 are aligned substantially parallel to each other. Between the circuit board 24 and the windscreen 14 a light conductor unit 30 is arranged, whose essential component is a lens plate. The housing 22 and the circuit board 24 are attached to the windscreen 14 via a coupler 32.

The emitter 26 emits light in a specific frequency range, wherein the term "light" is not restricted to visible light, but in particular comprises radiation in the infrared range. The light is emitted by the emitter 26 as a diverging light beam 34 directed onto an input portion 42 of the light conductor unit 30. The receiver 28 is adjusted to the emitter 26 and provides signals to an evaluation unit (not shown) corresponding to the detected impingement of light.

The lens plate of the light conductor unit 30 has a substantially planar back side 36 facing the windscreen 14, which in the mounted condition is aligned parallel to the windscreen 14. The light conductor unit 30 generally has a mirror-symmetric design, wherein the imaginary mirror plane extends between the emitter 26 and the receiver 28 vertical to the windscreen 14 and separates the input portion 42 from the mirror-symmetric output portion 44. The front side 38 of the lens plate facing the emitter 26 and the receiver 28 has a stepped structure (subsequently referred to as Fresnel structure), which will be explained in detail below. The steps 54 of the input portion 42 each have an input surface 56, through which part of the diverging light beam 34 emitted by the emitter 26 enters the light conductor unit 30. The input surfaces 56 are shaped in the manner of aspherical Fresnel lenses. In addition, the outer steps 54 of the input portion 42 (the two right-hand steps as seen in FIG. 2) have reflecting surfaces 58, which are aligned substantially vertical to the windscreen 14. Each reflecting surface 58 is associated to the input surface 56 of the associated step 54, as will become apparent from the functional description of the sensor device.

As mentioned already, the output portion 44 is formed symmetrical to the input portion 42, wherein the surfaces 56 of the output portion 44, which correspond to the input surfaces 56 of the input portion 42, are referred to as output surfaces 56, as the light beam 34b coupled out of the windscreen 14 leaves the light conductor unit 30 through these surfaces. In general, the Fresnel structure of the light conductor unit 30 thus includes Fresnel lens regions to which reflecting regions are associated, and Fresnel lens regions to which no reflecting regions are associated.

In the illustrated embodiment, the coupler 32 is formed by a transparent, elastic and substantially planar medium, which in the frequency range of the light emitted by the emitter 26 has no pronounced refractive properties.

In operation, the diverging light beam 34 emitted by the emitter 26 in the direction of the lens plate impinges on the input portion 42 of the light conductor unit 30. (For better clarity, FIG. 2 only shows those parts of the light beam 34 which are actually used for scanning the sensor surface.) The Fresnel lens regions provide a parallel alignment of the rays of the light beam parts, the input surfaces 56 of the outer steps 54 being shaped such that here the rays of the light beam parts aligned in parallel are directed onto associated reflecting surfaces 58 of the respective steps 54. The input surfaces 56 and the reflecting surfaces 58 are adjusted to each other such that upon reflection on the reflecting surfaces 58 all light beam parts generally form a uniform light beam 34a with rays aligned in parallel, which are directed onto the windscreen 14 at an angle of about 45°.

The light beam 34a aligned in parallel is coupled into the windscreen 14 by the coupler 32 without a substantial change in direction, i.e. the angle of incidence a is about 45°. In the windscreen 14, the light beam 34a undergoes total reflection, the light rays still remaining oriented in parallel. The impingement surface of the light beam 34a coupled into the windscreen 14 in parallel (light impingement surface 18 in FIG. 1) defines the sensor surface 46, i.e. that surface of the windscreen 14 which is examined for wetting by the respective sensor unit 12. Due to the symmetric construction of the coupler 32 and the light conductor unit 30, the optical path of the light beam upon total reflection in the windscreen 14 is symmetric to the optical path described above. This means that the reflected parallel light beam 34b is coupled out of the windscreen 14 by the coupler 32 under an emergence angle β of about 45° and is coupled into the output portion 44 of the light conductor unit 30 (light impingement surface 20 in FIG. 1). Upon partial reflection on the reflecting surfaces 58, light beam parts emerge from the light conductor unit 30 through the output surfaces 56. The output surfaces 56 are shaped such that they focus the light beam parts onto the receiver 28.

For a better signal evaluation, the signals provided by the receivers 28 of the pair of sensor units are subjected to a subtraction in the evaluation unit. The same is true for possible further pairs of sensor units 12, which belong to the sensor device 10.

To avoid a malfunction of a wetting sensor unit 12 due to an undesired input and/or output of light, the possible causes of which will be explained in detail below, at least part of the regions of the light conductor unit 30 remaining between the individual Fresnel lens regions or the associated reflecting regions is provided with refractive or reflective structures. Light which could otherwise be coupled in and out of the light conductor unit 30 through these intermediate regions and could disturb the operation of the sensor unit 12, thereby is diverted in "harmless" directions. Therefore, the intermediate regions can also be referred to as diverting regions.

In principle, it is possible in the embodiment described above that beside the desired parallel light beam 34a used for illuminating the windscreen 14 under an angle of 45° further, undesired light rays are generated in the regions of the light conductor unit 30 not provided with Fresnel structures due to refraction or reflection. These further light rays can illuminate objects such as grains of sand, which are located in front of the surface of the windscreen 14 and thus do not represent wetting. Part of the light rays can in turn be reflected by these objects and thus possibly can pass through other, non-structured regions of the light conductor unit 30 and finally into the receiver 28. Furthermore, extraneous light (e.g. sunlight) coming from outside likewise can pass through the unstructured regions into the light conductor unit 30 and finally impinge on the receiver 28. Light from the emitter 26 likewise possibly can pass to the receiver 28 directly as a result of multiple reflection in the middle region of the light conductor unit 30 (i.e. without "detour" through the windscreen 14). All these effects can lead to an erroneous detection of wetting.

The purpose of structuring the intermediate regions as diverting regions thus is to deflect undesired light by refraction or reflection such that the function of the sensor unit 12 is not impaired. One possibility of structuring the diverting regions known from another technical field is the so-called "cat's eye structure".

Figure 3:
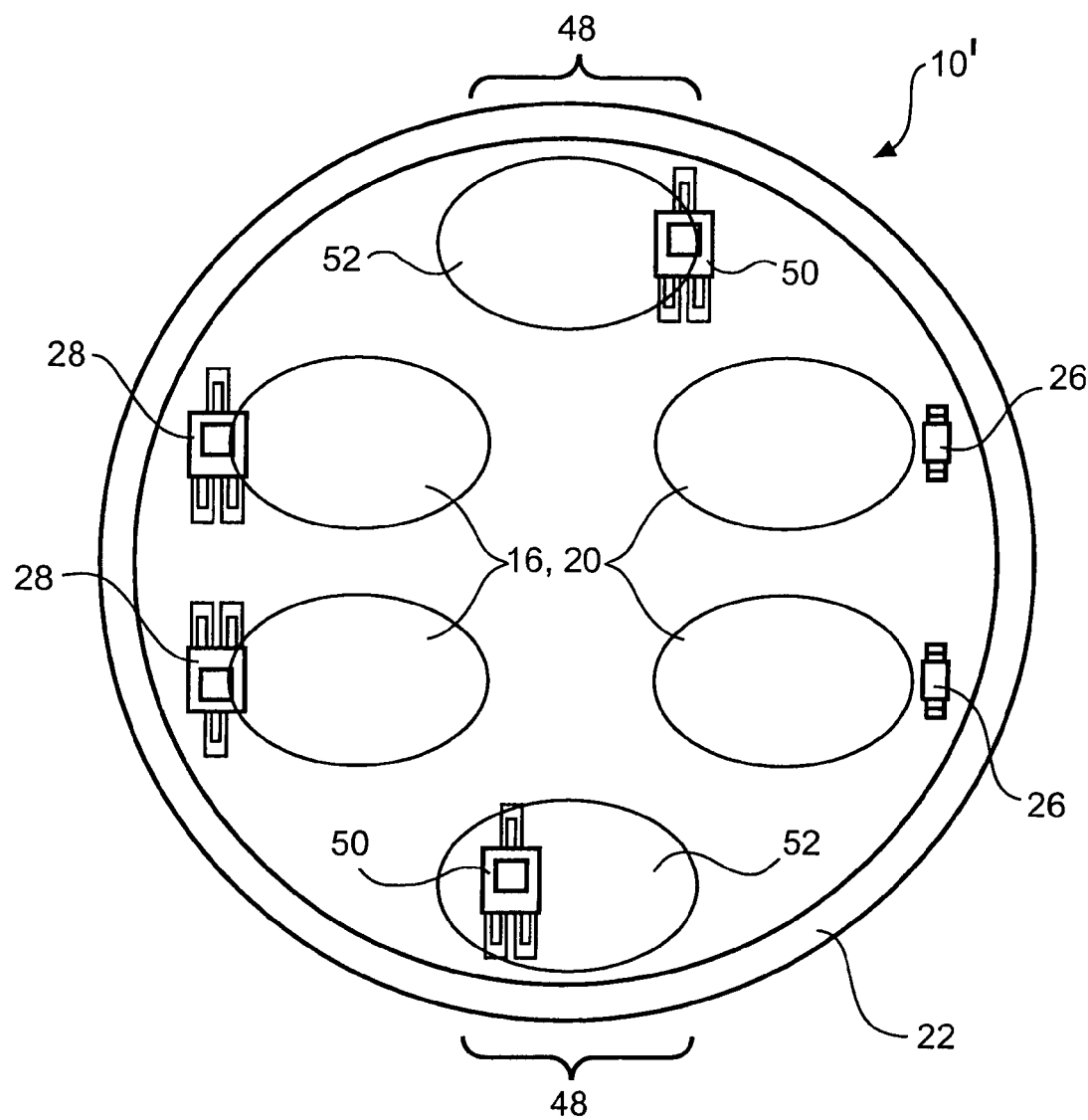
FIG. 3 schematically shows a top view of a further development of the optical sensor device in accordance with the invention.

FIG. 3 shows a further development of an optical sensor device 10'. In addition to the sensor units 12 for detecting the wetting of the windscreen 14, additional daylight sensor units 48 are provided here. The daylight sensor units 48 each comprise a light receiver 50 and a light conductor unit (not visible in FIG. 3).

Like in a wetting sensor unit 12, the light conductor unit of a daylight sensor unit 48 basically is rectangular with a substantially planar back side facing the windscreen 14 and arranged parallel to the same. The front side of the light conductor unit facing the light receiver 50 has Fresnel steps (without reflecting regions), which form an aspherical Fresnel lens. The optical axis of the Fresnel lens is inclined by about 45° with respect to the windscreen 14.

Alternatively, the light conductor unit of a daylight sensor unit 48 can be designed with Fresnel lens regions and reflecting regions, which are formed and arranged corresponding to the above-described Fresnel structure of a wetting sensor unit 12 (i.e. like the input portion 42 or the output portion 44 of the light conductor unit 30).

Each Fresnel lens or Fresnel structure maps light from a defined region 52 of the surroundings on the associated light receiver 50. The functionality thus is expanded to the effect that apart from an automatic wiper actuation the compact sensor device 10' also provides for an automatic control of the lighting system of a vehicle.

In principle, it is possible to form several or even all Fresnel structures (and possibly Fresnel lenses) of a sensor device of the invention in a single lens plate.

For producing a light conductor unit 30 proceeding from a rectangular lens plate of a suitable optical material, only minor modifications are necessary on the front side 38, in order to form the required Fresnel structure 40 (possibly with diverting regions). The light conductor unit 30 can be formed in the lens plate in particular by an embossing operation. In the same embossing operation, further light conductor units (for wetting or daylight sensor units) can be formed at the same time.

The invention claimed is:

1. An optical sensor device which is configured to be coupled to a window, the optical sensor device comprising a sensor unit which includes an emitter, a receiver and a light conductor unit, the light conductor unit being configured such that a diverging light beam emitted by the emitter is coupled into the window, coupled out of the window and directed and completely focused onto the receiver, the light conductor unit including Fresnel lens regions and reflecting regions associated to the Fresnel lens regions.

2. The optical sensor device according to claim 1, wherein the light conductor unit also includes Fresnel lens regions to which no reflecting regions are associated.

3. An optical sensor device which is configured to be coupled to a window, the optical sensor device comprising a sensor unit which includes an emitter, a receiver and a light conductor unit, the light conductor unit being configured such that a light beam emitted by the emitter is coupled into the window, coupled out of the window and directed onto the receiver, the light conductor unit including Fresnel lens regions and reflecting regions associated to the Fresnel lens regions, wherein the Fresnel lens regions and the reflecting regions are formed in a stepped structure of the light conductor unit, said stepped structure including an input portion with a plurality of steps, at least two of said steps having an input surface shaped in the manner of an aspherical Fresnel lens and a reflecting surface associated with the input surface, said stepped structure including an output portion with a plurality of steps, at least two of said steps of said output portion having an output surface shaped in the manner of an aspherical Fresnel lens and a reflecting surface associated with the output surface.

4. The optical sensor device according to claim 3, wherein the light conductor unit is formed by a plate, a front side of the plate including the stepped structure, the plate being arranged such that the front side of the plate faces at least one of the emitter and the receiver.

5. The optical sensor device according to claim 4, wherein the reflecting surfaces are aligned substantially vertical to the window.

6. An optical sensor device which is configured to be coupled to a window, the optical sensor device comprising a sensor unit which includes an emitter, a receiver and a light conductor unit, the light conductor unit being configured such that a light beam emitted by the emitter is coupled into the window, coupled out of the window and directed onto the receiver, the light conductor unit including Fresnel lens regions and reflecting regions associated to the Fresnel lens regions, wherein between the individual Fresnel lens regions and the associated reflecting regions diverting regions are provided, the diverting regions having a refractive or reflective structure such that light impinging on the diverting regions is diverted in a direction which does not impair the function of the optical sensor device.

7. The optical sensor device according to claim 1, wherein the light conductor unit includes an input portion, through which the light beam emitted by the emitter is coupled into the window, and an output portion, through which the light beam is coupled out of the window and is directed onto the receiver.

8. The optical sensor device according to claim 7, wherein the light conductor unit has a mirror-symmetric design.

9. The optical sensor device according to claim 7, wherein the light conductor unit if formed in one piece.

10. The optical sensor device according to claim 7, wherein in the input portion of the light conductor unit the Fresnel lens regions and the associated reflecting regions are each arranged such that part of the light beam emitted by the emitter is coupled into the light conductor unit via a Fresnel lens region and subsequently reflected on the associated reflecting region.

11. The optical sensor device according to claim 7, wherein in the input portion of the light conductor unit the reflecting regions are arranged such that reflected parts of the light beam emitted by the emitter altogether are coupled into the window as a parallel light beam.

12. The optical sensor device according to claim 11, wherein an angle, under which the light beam is coupled into the window, is approximately 45°.

13. The optical sensor device according to claim 12, wherein an angle, under which the light beam is coupled out of the window, is approximately 45°.

14. The optical sensor device according to claim 7, wherein in the output portion of the light conductor unit the Fresnel lens regions and the associated reflecting regions each are arranged such that part of the light beam coupled out of the window is reflected on a reflecting region and subsequently coupled out of the light conductor unit via the associated Fresnel lens region.

15. The optical sensor device according to claim 7, wherein in the output portion of the light conductor unit the Fresnel lens regions and the associated reflecting regions are each arranged such that parts of the light beam coupled out of the window are reflected by the reflecting regions onto the associated Fresnel lens regions and thereby are directed onto the receiver as converging light beam parts.

16. An optical sensor device which is configured to be coupled to a window, the optical sensor device comprising a sensor unit which includes an emitter, a receiver and a light conductor unit, the light conductor unit being configured such that a light beam emitted by the emitter is coupled into the window, coupled out of the window and directed onto the receiver, the light conductor unit including Fresnel lens regions and reflecting regions associated to the Fresnel lens regions, wherein in a housing of the sensor device at least one additional daylight sensor unit is accommodated, the daylight sensor unit including a light receiver and a light conductor unit which maps light from a defined region of the surroundings on the light receiver.

17. The optical sensor device according to claim 16, wherein the light conductor unit of the daylight sensor unit includes an aspherical Fresnel lens.

18. The optical sensor device according to claim 16, wherein the light conductor unit of the daylight sensor unit includes Fresnel lens regions and associated reflecting regions.

19. A method of producing an optical sensor device, the optical sensor device comprising a sensor unit which includes an emitter, a receiver and a light conductor unit, the light conductor unit being configured such that a light beam emitted by the emitter is coupled into the window, coupled out of the window and directed onto the receiver, the light conductor unit including Fresnel lens regions and reflecting regions associated to the Fresnel lens regions, the method comprising the step of forming the light conductor unit by embossing a plate.

20. The method according to claim 19, wherein in the same embossing step in which the light conductor unit is formed, at least one further light conductor unit for a daylight sensor unit is additionally formed in the same plate.

21. The optical sensor device according to claim 6, wherein the light conductor unit includes an input portion, through which the light beam emitted by the emitter is coupled into the window, and an output portion, through which the light beam is coupled out of the window and is directed onto the receiver, the diverting regions being provided in the input portion and the output portion.

22. The optical sensor device according to claim 11, wherein the whole diverging light beam emitted by the emitter is coupled into the window as a parallel light beam.

23. The optical sensor device according to claim 1, wherein the light conductor unit converts the diverging light beam into a parallel light beam and couples the parallel light beam into the window, the parallel light beam, after being reflected in the window, being coupled out of the window and directed and focused onto the receiver.

24. The optical sensor device according to claim 6, wherein the diverting regions have a refractive structure.

* * * * *